UNITED STATES PATENT OFFICE.

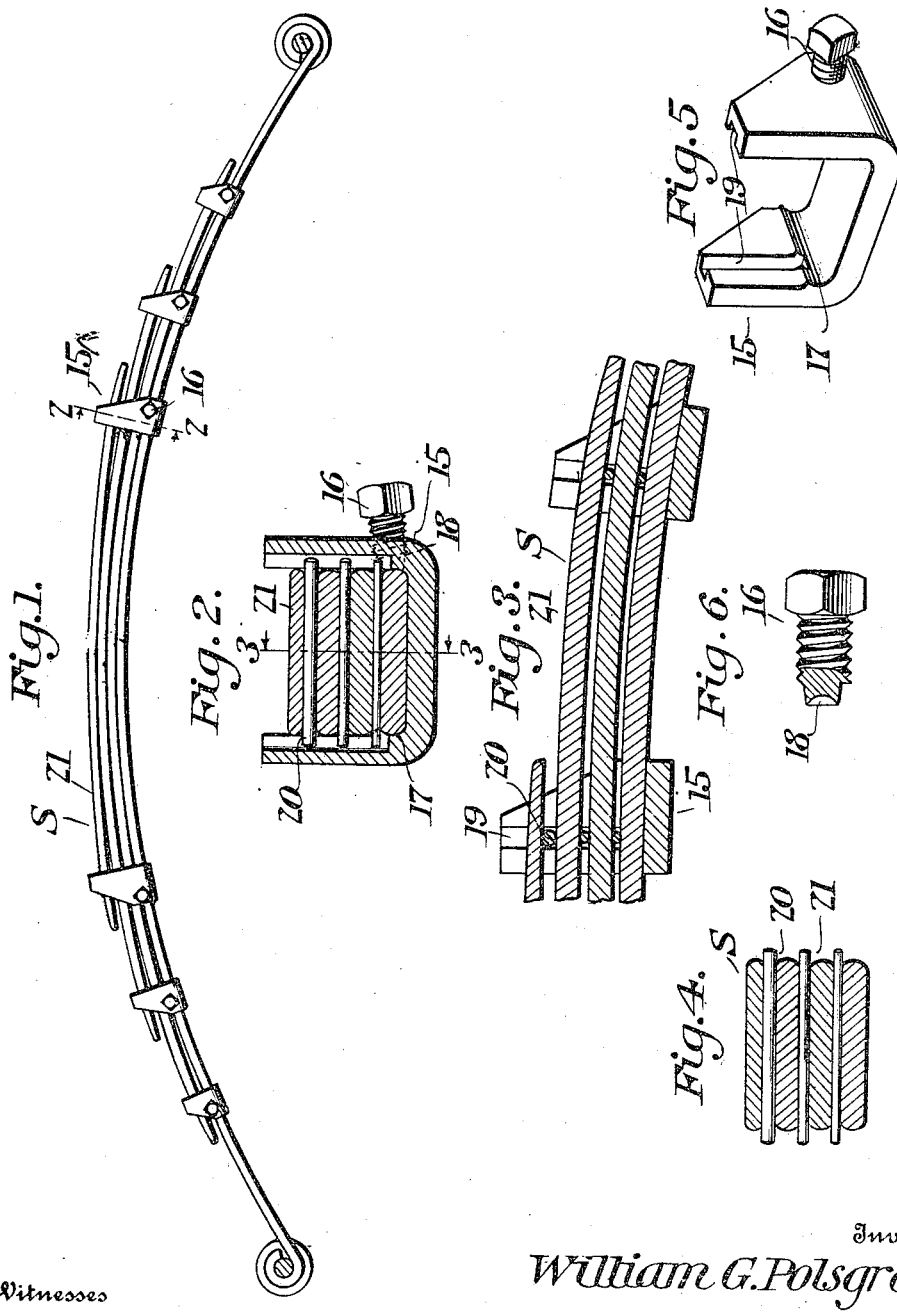

WILLIAM G. POLSGROVE, OF ROSWELL, NEW MEXICO.

ROLLER-CAGE FOR LEAF-SPRINGS.

1,159,265.     Specification of Letters Patent.     Patented Nov. 2, 1915.

Application filed May 5, 1915. Serial No. 26,106.

*To all whom it may concern:*

Be it known that I, WILLIAM G. POLSGROVE, a citizen of the United States, residing at Roswell, in the county of Chaves and State of New Mexico, have invented new and useful Improvements in Roller-Cages for Leaf-Springs, of which the following is a specification.

This invention relates to leaf springs for automobiles and other vehicles and for all purposes for which such springs are employed, and it has for its object to increase the life as well as the working efficiency of such springs.

A further object of the invention is to produce a simple and effective device whereby anti-friction members may be applied to ordinary stock springs in a convenient manner and without the use of skilled labor.

A further object of the invention is to produce a cage or holding device whereby one or more anti-friction rollers applied between the leaves of an ordinary stock spring will be retained securely in position.

A further object of the invention is to produce a simple device capable of being manufactured and marketed at small expense which may be readily applied to an ordinary stock spring to retain anti-friction rollers between the leaves thereof.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibted, but that changes, alterations and modifications within the scope of the claims may be resorted to when desired.

In the drawing,—Figure 1 is a side elevation of a portion of a leaf spring to which the invention has been applied. Fig. 2 is a transverse sectional view taken on the line 2—2 in Fig. 1. Fig. 3 is a longitudinal sectional view taken on the line 3—3 in Fig. 2. Fig. 4 is a transverse sectional view through a spring to which anti-friction rollers have been applied before the application of the cage or retaining member. Fig. 5 is a perspective view of the cage or retaining member detached, and Fig. 6 shows the set screw.

Corresponding parts in the several figures are denoted by like characters of reference.

The cage or retaining member of the improved device consists of a U-shaped clip 15 of proper dimensions to suit the spring to which it is to be applied, said clip being equipped with means whereby it may be securely mounted on the spring. In the drawing the securing means has been shown as consisting of a set screw 16 threaded through one limb of the clip 15 near the base or bridge portion thereof, said set screw being preferably disposed in a slightly inclined position, that is to say, it slants downward and inward in the direction of the bridge portion of the clip. This is in order that the set screw may exert a pulling action on the bridge portion of the clip with respect to the leaf of the spring engaged thereby. It will also be seen that there is formed in the inner face of the limb of the clip opposite to that equipped with the set screw 16 a shallow groove 17 adapted to form a seat for one edge of the leaf, the other edge of which is engaged by the set screw, it being obvious that by reason of said groove the clip or retaining member will be held with absolute security when the set screw is tightened. The engaging end of the set screw is preferably cupped, as seen at 18. The opposed faces of the limbs of the clip 15 are provided with vertical grooves or recesses 19 with respect to which the set screw 16 is preferably offset to one side, as shown, so that it will not interfere with the rollers, as will be presently seen.

In connection with each cage or retaining member there is used one or more anti-friction rollers 20, said rollers being preferably of a diameter less than the width of the grooves 19 which are engaged thereby. It is to be understood that while anti-friction rollers of very small diameter are preferably intended to be used, no limitation is intended in this respect, it being further understood that anti-friction rollers of different diameters may be used in connection with each cage or retaining member. The rollers are to be of a length approximately equal to the distance between the bottom faces of the grooves 19 of the cage in connection with which they are to be used, said rollers being, therefore, of a length somewhat exceeding the width of the leaves of the spring to which they are to be applied.

The spring S shown in the illustration has a plurality of leaves 21 which are connected together or assembled in the customary manner intermediate the ends thereof. Any ordinary leaf spring is capable of having my invention applied thereto, it being particularly understood that the invention is especially adapted for the purpose of applying anti-friction element to stock springs of conventional construction. To apply the invention, the leaves are forced or spread slightly apart at the ends thereof to permit the introduction therebetween of the rollers 20, the latter, where a plurality is used, being arranged in vertical alinement. The cage or retaining member is then slid in position, said retaining member straddling the spring and the grooves in the inner faces of the limbs thereof receiving the projecting ends of the anti-friction rollers. After pushing the cage onto the spring as far as it will go, the set screw is tightened against one side edge of the bottom or main leaf which is usually of greater thickness than the remaining leaves, and the device will thus be held securely in position, serving to retain the anti-friction rollers between the leaves.

By the application of the improved anti-friction device rusting of the spring leaves will be largely obviated; creaking of the springs will be prevented without the use of lubricating material; the resiliency of the springs will be increased, thereby promoting easy riding without the use of shock absorbers, and the life of the springs will be greatly increased.

The device may be easily applied without resorting to skilled labor, and in the event of breakage or injury to any of the rollers it may be very easily and quickly replaced.

Having thus described the invention, what is claimed as new, is:—

1. A roller cage consisting of a U-shaped clip, the limbs of which are provided with roller engaging grooves in their inner faces, said cage having means whereby it may be secured for operation on a leaf spring.

2. A roller cage for leaf springs consisting of a U-shaped clip, the limbs of which have roller engaging grooves in their inner faces, one limb of said clip having a set screw threaded therethrough near the bridge portion thereof.

3. A roller cage for leaf springs consisting of a spring straddling clip, the limbs of which have roller engaging grooves in their opposed faces, one limb of said clip having a set screw threaded therethrough in an inclined position, and the other limb having a shallow groove in its inner face adjacent to the bridge portion.

4. A roller cage for leaf springs comprising a U-shaped clip straddling the spring and having roller engaging grooves in the opposed faces of the limbs thereof, means for securing the clip in adjusted position on a spring, and a roller positioned between two leaves of the spring and terminally engaging the grooves in the inner faces of the limbs of the clip.

5. The combination with a leaf spring, of an endwise removable retaining element or cage having side members, the opposed faces of which are provided with roller engaging grooves, a roller positioned between the opposed faces of two leaves of the spring and terminally engaging said grooves, and means for securing the retaining element on the spring.

In testimony whereof I affix my signature in presence of two witnesses.

WILLIAM G. POLSGROVE.

Witnesses:
 WM. BAGGER,
 H. HOUGH.